Figure 1:
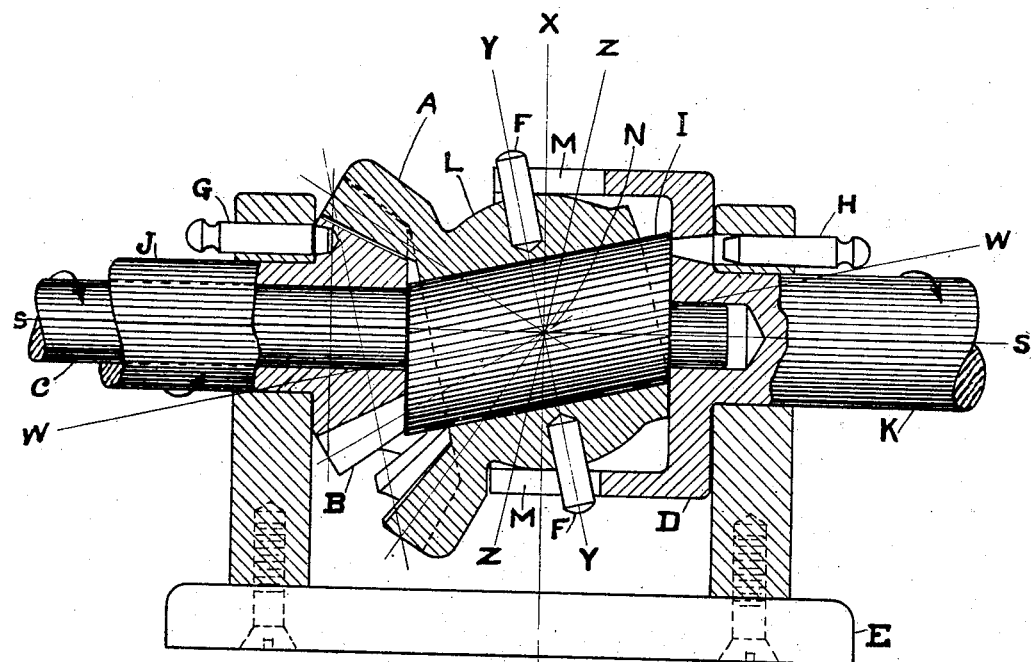

C. J. W. HAYES.
MECHANICAL MOVEMENT.
APPLICATION FILED JAN. 15, 1917.

1,246,918.

Patented Nov. 20, 1917.

INVENTOR
Chas. J. W. Hayes.
Attorneys.

UNITED STATES PATENT OFFICE.

CHARLES J. W. HAYES, OF DETROIT, MICHIGAN.

MECHANICAL MOVEMENT.

1,246,918.   Specification of Letters Patent.   Patented Nov. 20, 1917.

Application filed January 15, 1917. Serial No. 142,462.

*To all whom it may concern:*

Be it known that I, CHARLES J. W. HAYES, a citizen of the United States of America, residing at Detroit, in the county of Wayne and State of Michigan, have invented certain new and useful Improvements in Mechanical Movements, of which the following is a specification, reference being had therein to the accompanying drawings.

The invention relates to mechanical movements and more particularly to a type adapted for irreversible transmission of power. The invention comprises the novel construction and combination of mechanical elements including a rotating drive member carrying an internal bevel gear wheel revoluble about an axis at an angle to the axis of rotation of said drive member together with the coöperating external bevel gear in mesh therewith. The arrangement is such that the rotation of the drive member will cause a planetary movement of the bevel gear wheels, one about the other, and at the same time a differential rotational movement due to the ratio existing between the two gears. Thus if one of said gears is held from rotation the other will be caused to revolve whenever the main drive shaft is rotated. On the other hand the movement is irreversible as any attempt to rotate the driven member will only cause an interlock.

My invention is applicable to a great variety of specific mechanisms but as specifically shown it is adapted for the irreversible transmission of rotary power in reverse directions.

Figure 2:
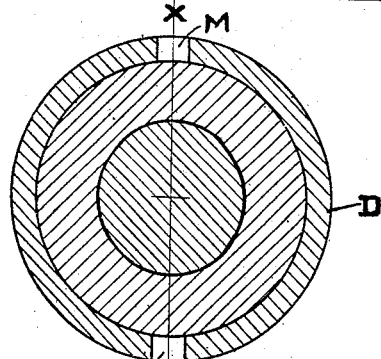

In the drawings:

Figure 1 is a central longitudinal elevation partly in section through the mechanism; and Fig. 2 is a cross section on line *x—x* of Fig. 1.

C is a drive shaft which is journaled in suitable bearings in a frame E and is provided with a cylindrical portion I having its axis at an angle to the main axis of the shaft. Upon this portion I is journaled an internal bevel gear wheel A which is in mesh with an external bevel pinion B concentric with the main axis of the shaft C. The cones of the two gears have their common apex lying in the point of intersection of the two axes and consequently any rotation of the shaft C about its main axis will cause the planetary movement of the gear A about the gear B. Inasmuch, however, as the gears are in predetermined ratio, the one having more teeth than the other, this planetary movement will not produce an equal rotational movement about their respective axes. Furthermore, if one of the gears is held from rotation all of the movement will be imparted to the other, the speed being dependent upon the ratio between the gears.

As shown the mechanism is provided with two alternatively operable driven members, the one being a tubular shaft J upon the shaft C and integral with the gear wheel B while the other is a shaft K in axial alinement with the shaft C. The latter shaft is provided with a recessed head or yoke D which embraces a spherical hub portion L of the gear wheel A and is so coupled thereto by pins F engaging slots M as to permit an independent oscillatory movement while compelling rotation about the common axis S S.

Provision is also made for alternatively locking the members A and B from rotation which as shown comprises the locking pin G in the frame E engageable with the gear wheel B and the locking pin H in the frame engageable with the member D.

With the parts in the position of adjustment shown in Fig. 1 the pin G is in engagement to lock the gear wheel B from rotation while the pin H is disengaged to permit free rotation of the member D and shaft K. If the member C is then revolved as indicated by the arrow the angling portion I will be revolved therewith which will cause an oscillatory movement of the gear wheel A about the point N. The gear wheel A is not compelled to rotate with the shaft C at the same angular speed as it is free to revolve upon the angling cylindrical portion I but the fact that it remains in mesh with the gear wheel B and that the latter is locked from the rotational movement will cause the rotation of said gear wheel A about its angling axis W W. This rotational movement is communicated through the universal joint formed by the pins F and slots M in the member D and the shaft K which is driven in the same direction as the shaft C but the ratio of speeds of the shafts C and K is determined by the ratio existing between the gears A and B.

If it is desired to reverse the direction of movement by disengaging the pin G and engaging the pin H the gear wheel B will be permitted to revolve while the gear wheel A will be locked from rotation but still permitted oscillation.

This will cause the driving of the shaft J in the direction indicated by the arrow which is the reverse of the direction of rotation of the shaft C. The speed ratio of the drive and driven shafts is also determined by the ratio between the gears A and B but is not the same as the speed imparted to the shaft K in the adjustment previously described, the ratio of driver to final driven shaft being determined by the ratio of the difference between the two gears to each of them respectively.

With the construction as described in either of the two adjustments the mechanism is irreversible. Thus where the adjustment is as shown any attempt to drive the shaft C from the shaft K would only result in wedging and interlocking of the gears. In the same manner where the adjustment is for driving the shaft J any attempt to rotate said shaft will result in locking of the gears.

As has been previously stated my improved mechanical movement is applicable to a large variety of useful mechanisms, the gear ratios being possible of variating through a wide range as well as details of construction, but I should not enter into a description of these various uses of the present application.

As used in this application, the term "internal bevel gear" is intended to include the so-called crown bevel gear and in the other direction of conical height up to infinity.

What I claim as my invention is:

1. In a mechanical movement, the combination with a rotary drive member having a journal portion with its axis at an angle to the main axis of rotation, internal and external bevel gear wheels mounted on said rotary member respectively concentric with the two axes thereof, and means for holding either of said gear wheels from rotation.

2. In a mechanical movement, the combination of a rotary drive member having a journal portion with its axis at an angle to the main axis of rotation, an internal bevel gear wheel revolubly mounted on said journal portion, an external bevel pinion arranged concentric to the main axis of said drive member and in mesh with said internal bevel gear wheel and means for locking either of said bevel gear wheels from rotation.

3. In a mechanical movement, the combination with a revoluble shaft, of a journal bearing on said shaft having its axis at an angle to the axis of rotation, a member revolubly mounted upon said journal portion and provided with an internal bevel gear wheel, a bevel pinion concentric with the main axis of said shaft and in mesh with said internal bevel gear wheel, and means for alternatively locking said bevel gear wheels from rotation.

4. In a mechanical movement, the combination with a rotary drive shaft, of a journal bearing on said shaft having its axis at an angle to the axis of rotation, internal and external bevel gear wheels mounted on said shaft respectively concentric with the main axis and the angling axis, said gear wheels being in mesh with each other and having the common apex of their cones at the point of intersection of the two axes and within said journal bearing, and means for locking either of said gear wheels from rotation.

5. In a mechanical movement, the combination with a rotary drive shaft, of a journal bearing on said shaft having its axis at an angle to the axis of rotation, a member revolubly engaging said journal, an internal bevel gear wheel carried by said member, an external bevel pinion concentric with the main axis of said drive shaft and in mesh with said internal bevel gear wheel, a shaft in axial alinement with the main drive shaft, a universal coupling between said shaft and the member mounted on said journal bearing permitting oscillation of the latter, and means for alternatively locking said gear wheels from rotation.

6. In a mechanical movement, the combination of an internal and an external bevel gear in mesh with each other, a rotary drive member having a journal portion at an angle to its main axis of rotation, and a universal joint centering at the common apex of the generating cones of said gears.

7. In a mechanical movement, the combination of a pair of bevel gears in mesh with each other, a rotary drive member having a journal portion at an angle to its main axis of rotation and a universal joint, said journal and said joint centering substantially at the common apex of the generating cones of said gears.

8. In a mechanical movement, the combination of a rotary drive member having a journal portion with its axis at an angle to the main axis of rotation, a bevel gear in axial alinement with said main axis, another bevel gear journaled to wabble on said angular axis and in mesh with the aforesaid gear, and a universal joint adapted to transmit rotary motion from the wabbling gear.

9. In a mechanical movement, the combination of a rotary drive member having a journal portion with its axis at an angle to the main axis of rotation, a gear wheel in axial alinement with said main axis, a second gear wheel journaled to wabble on said angular axis and meshing with said first mentioned gear wheel, and a member connected to said second gear wheel to be rotated therewith, permitting of the wabbling action.

In testimony whereof I affix my signature.

CHARLES J. W. HAYES.